April 30, 1968 F. BURHORN ETAL 3,381,158

APPARATUS FOR REDUCING THE EXTENT TO WHICH A METAL ELECTRODE IS CONSUMED IN AN APPARATUS WHICH OPERATES WITH AN ELECTRIC ARC

Filed Oct. 19, 1965 2 Sheets-Sheet 1

April 30, 1968 F. BURHORN ETAL 3,381,158

APPARATUS FOR REDUCING THE EXTENT TO WHICH A METAL ELECTRODE IS CONSUMED IN AN APPARATUS WHICH OPERATES WITH AN ELECTRIC ARC

Filed Oct. 19, 1965 2 Sheets-Sheet 2

United States Patent Office 3,381,158

Patented Apr. 30, 1968

3,381,158

APPARATUS FOR REDUCING THE EXTENT TO WHICH A METAL ELECTRODE IS CONSUMED IN AN APPARATUS WHICH OPERATES WITH AN ELECTRIC ARC

Friedrich Burhorn and Fritz Schmidt, Erlangen, and Manfred Strossner, Nuremberg, Germany, assignors to Siemens Aktiengesellschaft, Munich, Germany, a corporation of Germany Filed Oct. 19, 1965, Ser. No. 497,886

Claims priority, application Germany, Dec. 8, 1964, S 94,506

14 Claims. (Cl. 314—136)

Our invention relates to apparatus in which operations are carried out with an electric arc which extends across the gap between a pair of electrodes.

Apparatus of this latter type is used for heating, for welding, for cutting, etc. Frequently, one encounters when using such apparatus the problem of maintaining the arc at a substantially constant length. In order to achieve this latter objective it is essential to provide electrodes which resist being consumed as much as possible. It is conventional to use for such purposes metal electrodes which are suitably cooled and which are made up of alloys specially designed for the particular purpose of the apparatus. However, in spite of these well-known measures, it often happens that the stability of the electrode is insufficient.

The burning away of the electrodes can be further reduced by providing an electric arc which rotates in a magnetic field or by rotating the electrodes themselves. However, one often encounters limitations with respect to the available space which greatly limits the dimensions of the electrodes. Thus, in plasma burners one encounters the problem of providing a relatively high arc output for a working gas in a relatively small space. The known electrodes are not always equal to the extreme requirements which are encountered in practice.

It is accordingly a primary object of our invention to provide a method and apparatus which will reduce the extent to which electrodes, particularly metal electrodes, are consumed in an apparatus which operates with an electric arc, and in particular it is an object of our invention to provide a reduction in the extent to which the electrodes burn away beyond the reduction which can be brought about with presently known measures.

It is in particular an object of our invention to provide a method and apparatus which not only are capable of reducing, beyond what has heretofore been possible, the extent of consumption of an electrode in an apparatus which operates with an electric arc, but in addition to provide such a method and apparatus which can be used conjointly with known measures for reducing the extent to which the electrodes are consumed.

The objects of our invention include the provision of a method and apparatus which make it possible to protect during operation of an apparatus of the above type electrodes which are difficult to change, so that changing of the electrodes is not required and the apparatus can be maintained in operation over a long period of time.

Furthermore, it is an object of our invention to provide a method and apparatus which do not require any critical adjustments or the like, so that the method of our invention is quite easy to carry out and the apparatus does not require parts of high precision.

In fact, it is an object of our invention to provide a method and apparatus which require little or no additional electrical connections beyond those which are in any event required for the method and apparatus without our invention.

It is also an object of our invention to provide a method and apparatus which are particularly suitable for reducing the extent of consumption of electrodes made of a material such as copper, or in other words for electrodes of materials which do not lend themselves to reduction in the extent of consumption by way of chemical reactions.

In addition, although it is an object of our invention to provide a method and apparatus which can be used in conjunction with known methods and apparatus for reducing the extent to which electrodes are consumed, it is also an object of our invention to provide a method and apparatus which can be used by itself to reduce the extent to which the electrodes are burned away.

In certain types of apparatus it is desirable to substantially limit the reduction of electrode consumption to only one of the electrodes. For example in the case of automatic arc welding or when using a plasma burner for depositing weldments to fill in irregularities, for example, where a transfer type of electrical connection is provided, the potection can be limited to the cathode. Therefore, it is also among the objects of our invention to provide a method and apparatus capable of limiting the reduction in electrode consumption to one of the electrodes such as the cathode, for example.

Our invention is illustrated by way of example in the accompanying drawings which form part of the application and in which.

Figure 1:
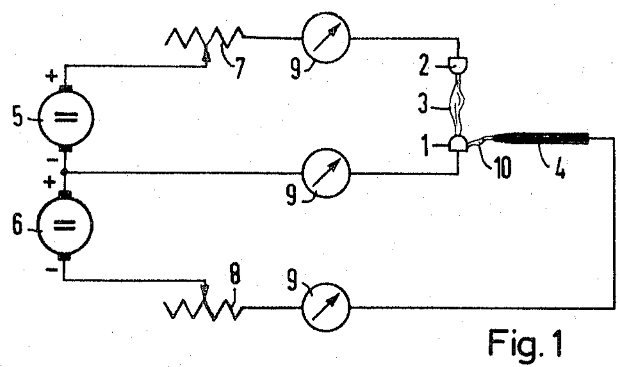
FIG. 1 is a schematic representation of one possible method and apparatus according to our invention.

The method and apparatus of our invention as well as the structure shown in the drawings are described below in connection with specific examples which follow and which are set forth in connection with the drawings. In order to simplify the examples which follow as well as the description of our invention, the method and apparatus thereof are described below by themselves and not as measures to be taken in addition to known methods and apparatus, although it is to be understood that our invention is particularly adapted for use in conjunction with known methods and apparatus for reducing the extent of electrode consumption in apparatus which operates with an electric arc.

As a measure of the extent of electrode consumption, in all examples the weight loss of the electrodes after operation of the arc for one hour was used, so that by weighing the electrodes before and after tests which lasted one hour it was possible to determine the extent to which the electrodes were consumed. Thus, before each test the electrodes were weighed and then after one hour, at the end of the test, the electrodes were again weighed. In the examples which follow the electrodes, which were spaced from each other to provide the gap across which the arc extends, had a voltage of approximately 55–60 v. applied thereto in order to achieve arcing across the gap between the electrodes.

EXAMPLE 1

According to FIG. 1, the electrodes include the copper cathode 1 and the copper anode 2 which are spaced from each other by a distance of 10 mm. These electrodes 1 and 2 are cooled by unillustrated cooling passages which communicate with a source of cooling water which circulates through the electrodes in a known manner. FIG. 1 illustrates the arc 3 which extends between the electrodes 1 and 2 during operation of the apparatus, and this arc 3 together with the electrodes 1 and 2 form a predetermined zone of the apparatus.

In accordance with our invention there is situated in the immediate vicinity of this latter zone a carbonaceous material which in accordance with our invention is located close enough to this zone to be heated during operation of the apparatus and furthermore, the carbonaceous material is located close enough to the zone to show evidence of being consumed during operation of the apparatus.

In the example of FIG. 1 the carbonaceous material takes the form of a body which consists at least in part of carbon and which is illustrated as a carbon rod 4 forming an auxiliary electrode.

In this particular example the auxiliary electrode 4 is situated at a distance of approximately 2–3 mm. from the cathode 1. The apparatus includes direct current generators 5 and 6 which are electrically connected with the electrodes 1 and 2 in such a way that the auxiliary electrode 4 has a negative potential with respect to the cathode 1 which cooperates with the electrode 2 in order to provide the primary arc 3. Thus, the cathode 1 is electrically connected as an anode with respect to the auxiliary electrode 4 which of course electrically has the relationship of a cathode to the electrode 1. Thus, while the cathode 1 is considered as negative with respect to the anode 2, it is considered as positive with respect to the auxiliary electrode 4. During operation of the apparatus a secondary arc 10 extends between the electrodes 1 and 4.

The circuit in which the direct current generator 5 is situated includes an adjustable variable resistor 7 which limits the current used for generating the primary arc 3 to 12 amps. In the circuit which includes the direct current generator 6, there is an adjustable variable resistor 8 which limits the current intensity used for the secondary arc 10 to approximately 2.5–3 amps.

The length and the changes in the length of the secondary arc 10 are of no particular criticality with respect to the protection of the electrodes, and these factors can be maintained in surprisingly large ranges without making any difference in the results which are achieved with our invention. The adjusted current intensity can be controlled by way of current measuring devices such as the ammeters 9. At the above-mentioned distances between the electrodes, there is a voltage drop at the auxiliary arc 10 of approximately 20 v. and at the primary arc 3 of 55–60 v., as mentioned above.

With the above values for the voltage and current, after one hour the cathode 1 showed a weight loss on the order of only 17 mg. and the anode 2 showed a weight loss of only 52 mg. For comparison purposes the same test was carried out without the auxiliary cathode 4, and in this case the weight loss of the cathode 1 was approximately 217 mg. while the weight loss of the anode 2 was 104 mg. This comparison permits evaluation of the reduction in electrode consumption achieved with the next following examples.

EXAMPLE 2

It is possible to limit the reduction in electrode consumption primarily to the cathode where the arc is achieved from a direct current generator, if the carbon rods are positioned without any potential so close to the arc that such carbon rods are consumed to a discernible extent. According to FIG. 2 a support means is formed by a holding ring 11 which surrounds the arc 3 which extends across the gap between the copper electrodes 1 and 2. This support means or holding ring 11 is formed with a plurality of openings in which the carbon rods 12 are axiallly shiftable so that they can be moved radially toward and away from the arc 3. Thus, during operation of the apparatus if the inner ends of the rods 12 become consumed they can always be moved further in toward the arc so as to maintain the operations.

In this example the electrodes 1 and 2 are spaced from each other by a distance of 10 mm. The carbon rods 12 are positioned without any potential and do not have to be electrically connected with each other. The arc 3 is derived from the D.C. voltage generator 5, and the intensity of the current is adjusted by the variable resistor 7 and controlled by way of the measuring device 9 which can take the form of an ammeter. When using the electrical data used also in Example 1 for the primary arc, namely a current intensity of 12 amps and a voltage drop of 55–60 v., it was determined that the cathode 1 in FIG. 2 had a weight loss of approximately 4 mg. On the other hand, the anode 2 experienced a weight loss of approximately 99 mg. Thus, the reduction in electrode consumption of the cathode was greater than in the case of Example 1. In order to achieve a reduction in the extent of cathode consumption, the auxiliary electrodes 12 were situated at such a distance from the zone in which the arc is located that such rods 12 were consumed to a discernible extent. During operation of the apparatus the carbon rods 12 were from time to time shifted inwardly toward the arc 3 to compensate for burning away of the inner ends of the rods 12. After a period of one hour for the test, in the case where the rods 12 were each 5 mm. thick and were distributed by the holding ring 11 at an angular distance of 90° from one rod 12 to the next rod 12, it was found that the total carbon consumption was 6 g.

EXAMPLE 3

Figure 3:
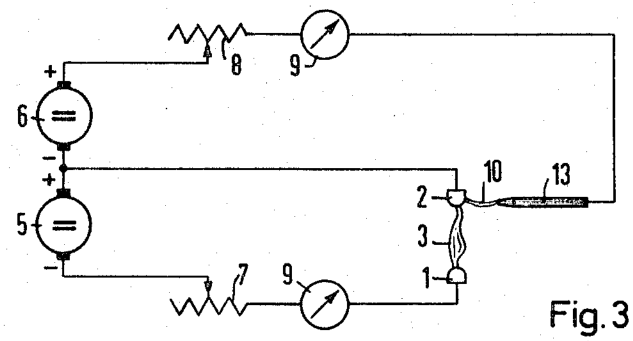
FIG. 3 is a schematic illustration of a further embodiment of a method and apparatus according to our invention.

With the apparatus of our invention as illustrated in FIG. 3, it is possible also to limit the reduction in electrode consumption primarily to the cathode. In this case the copper anode 2 is electrically connected with an auxiliary electrode 13 in such a way that the anode 2 has the relationship of a cathode with respect to the electrode 13 made of carbon and of course having the relationship of an anode with respect to the electrode 2. The copper cathode 1 is again positioned at a distance of 10 mm. from the anode 2. The primary arc is supplied by a D.C. voltage generator 5. The current intensity is adjusted by the adjustable variable resistor 7 and is indicated at the meter 9, and the adjustment is such that the current intensity for the primary arc 3 is 12 amps. The auxiliary anode 13 for the secondary arc 10 is positioned at a distance of approximately 2–3 mm. from the anode 2 and is arranged beside the primary arc 3 adjacent the anode 2. The secondary arc 10 is generated by the D.C. voltage generator 6, and its current intensity is adjusted by the variable resistor 8 and maintained by the meter 9 at approximately 2.5–3 amps. After one hour of operation of this apparatus, it was determined that the cathode 1 experienced an extremely small weight loss of 4 mg.

EXAMPLE 4

Figure 2:
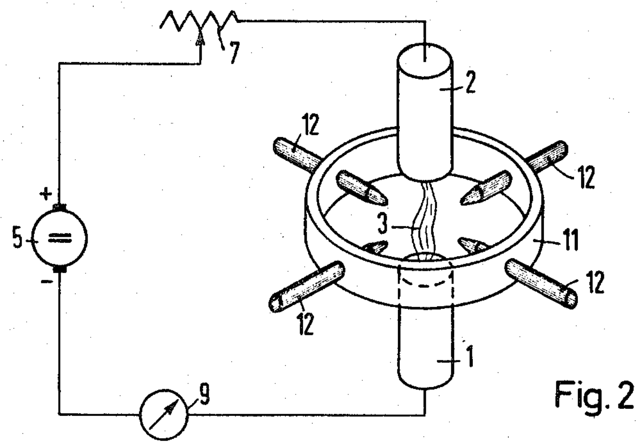
FIG. 2 is a schematic representation of another embodiment of a method and apparatus according to our invention.
Figure 4:
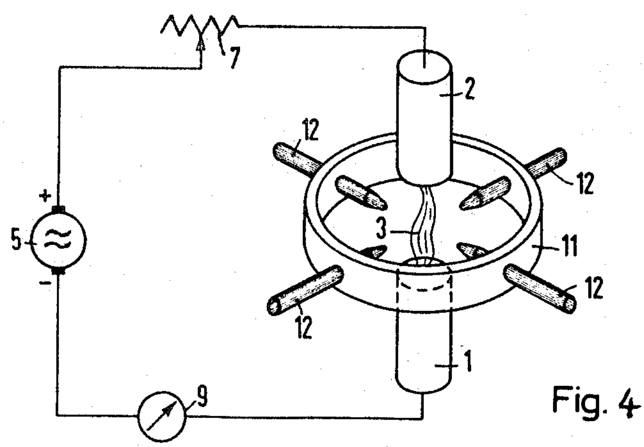
FIG. 4 is a schematic representation of yet another embodiment of a method and apparatus according to our invention.

If the apparatus of our invention as illustrated in FIG.2 is changed so that instead of a D.C. voltage generator 5 in alternating current voltage generator is connected into the circuit, then an alternating current arc will be provided between the electrodes 1 and 2, as indicated in FIG. 4. In order to measure the current, a meter 9 is used, and this particular meter is one which is capable of measuring the current intensity of the alternating voltage. The electrodes 1 and 2 are again positioned at a distance of 10 mm. from each other. By way of the adjustable variable resistor 7 the current intensity is adjusted to 12 amps. With this example, for the apparatus shown in FIG. 4, at approximately the same extent of carbon consumption for the rods 12 as in the case of Example 2 and FIG.2, there was after a test operation of one hour a weight loss for the electrodes 1 and 2 which was approximately midway between the extent of cathode and anode consumption of the test of Example 2. In other words, there was a carbon consumption of 6 g. of the same carbon rods 12 as were used in the case of FIG. 2, while each of the electrodes 1 and 2 had a weight loss on the order of 50 mg.

In all of the above examples copper electrodes were used so as to provide good possibilities of comparison. However, our invention has similar beneficial effects with electrodes made of other metals. In order to explain the results which are achieved with our invention, it is possible that with the method and apparatus of our invention a monomolecular layer of carbon becomes deposited upon the metal electrodes, and this monomolecular layer of carbon has a high emission than the metal electrodes. This conclusion is supported by the fact that in the case of an atmosphere in which carbon-containing compounds are situated, the extent of electrode consumption was reduced when no compounds capable of attacking the electrodes were set free from the carbon-containing compounds.

We claim:

1. Apparatus for reducing the extent to which a metal electrode is consumed in an apparatus where the metal electrode defines with another electrode a gap across which an arc extends between the electrodes during operation of the apparatus, said electrodes and gap therebetween defining a predetermined zone of the apparatus, comprising carbonaceous material situated close enough to said zone to provide for heating of said carbonaceous material and consumption of said carbonaceous material to a discernible extent during operation of the apparatus.

2. Apparatus as recited in claim 1 and wherein the apparatus includes a direct current source for the arc between said electrodes, said carbonaceous material being in the form of an auxiliary carbon electrode, being situated adjacent said metal electrode, and said metal electrode being a cathode with respect to said other electrode and being electrically connected with said carbon auxiliary electrode to have an anode relationship thereto.

3. Apparatus as recited in claim 1 and wherein said metal electrode is a cathode and said arc is generated from a source of direct current, said carbonaceous material being in the form of a body consisting at least in part of carbon and being positioned without any potential close enough to said zone where the arc is located during operation of the apparatus to provide for consumption of said body to a discernible extent.

4. Apparatus as recited in claim 1 and wherein said metal electrode is a cathode and said other electrode is an anode and said arc is generated from a source of direct current, said carbonaceous material being in the form of a carbon auxiliary anode situated adjcent said other electrode which is electriclly connected with respect to said carbon auxiliary anode so as to have the relationship of a cathode thereto.

5. Apparatus as recited in claim 1 and wherein said arc is generated from a source of alternating current and said carbonaceous material is in the form of a body consisting at least in part of carbon and positioned without potential so close to said zone where said arc is located, during operation of the apparatus, that said body is consumed to a discernible extent.

6. Apparatus as recited in claim 1 and wherein said metal electrode is made of copper.

7. In an apparatus which operates with an electric arc, a pair of electrodes at least one of which is made of metal and defines with the other a gap across which an arc extends between said electrodes during operation of the apparatus, said electrodes and gap defining a predetermined zone of the apparatus, and a carbon electrode situated in the immediate vicinity of said zone close enough thereto during operation of the apparatus to provide heating of said auxiliary carbon electrode and consumption of said auxiliary carbon electrode to a discernible extent.

8. In an apparatus as recited in claim 7, said auxiliary carbon electrode being situated adjacent said metal electrode which is electrically connected as a cathode with respect to said other electrode and said apparatus including a source of direct current for generating said arc between said metal electrode and said other electrode, and said auxiliary carbon electrode being electrically connected into the circuit to have the relationship of a cathode with respect to said metal electrode.

9. In an apparatus as recited in claim 7, said auxiliary carbon electrode being situated adjacent said other electrode which is electrically connected as an anode with respect to said metal electrode, said apparatus including a source of direct current for the arc between said metal electrode and said other electrode and said auxiliary carbon electrode being electrically connected with said other electrode so as to have the relationship of an anode with respect thereto, whereby said other electrode which acts as an anode with respect to said metal electrode acts as a cathode with respect to said auxiliary carbon electrode.

10. In an apparatus as recited in claim 7, support means supporting said carbon electrode without any electrical connections thereto in proximity to an arc extending between said electrodes.

11. In an apparatus as recited in claim 10 and wherein a source of direct current is operatively connected with said electrodes for generating an arc therebetween during operation of the apparatus.

12. In an apparatus as recited in claim 10 and wherein a source of alternating current is operatively connected with said electrodes for generating an arc therebetween.

13. In an apparatus as recited in claim 10 and wherein a plurality of said carbon electrodes are distributed about said arc and held by said holding means in proximity thereto.

14. In an apparatus as recited in claim 13, said holding means positioning said plurality of electrodes uniformly about said arc for radial movement toward the latter as said carbon electrodes become consumed.

References Cited

UNITED STATES PATENTS 2,607,024 8/1952 Marwell et al. ------ 314—34 X
2,624,026 12/1952 Noffsinger ----------- 314—35

BERNARD A. GILHEANY, *Primary Examiner.*
R. N. ENVALL, Jr., *Assistant Examiner.*